April 23, 1946.    W. C. WEHNER ET AL    2,398,983
SNAP GAUGE
Filed June 9, 1943    3 Sheets-Sheet 1
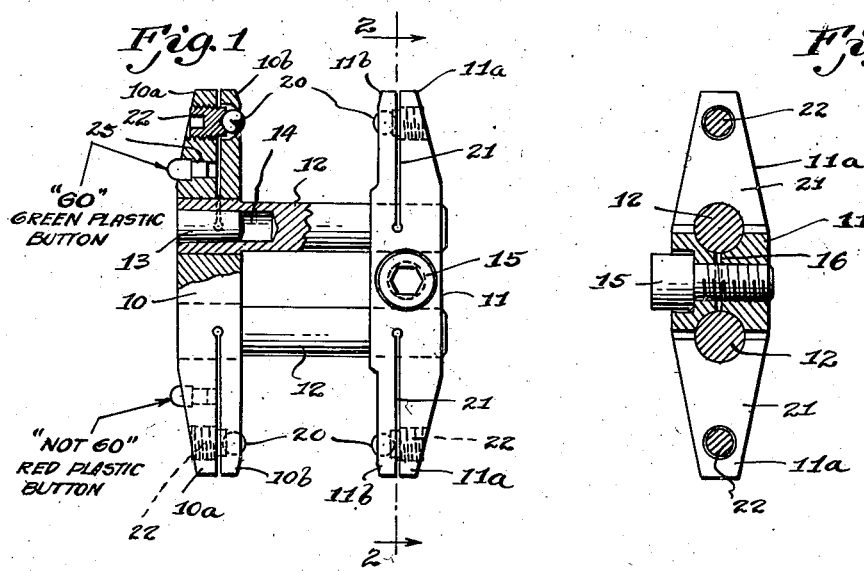
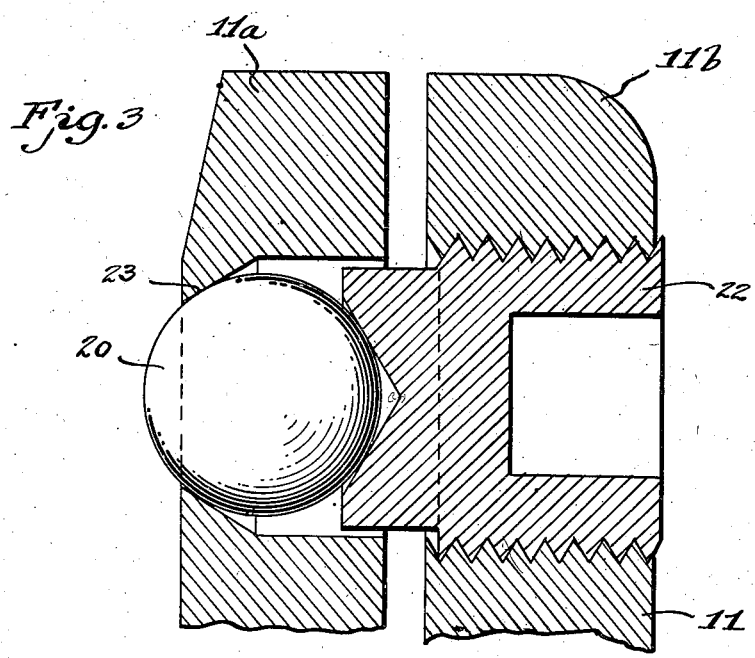
William C. Wehner
Wilson V. Giovara
INVENTORS
BY G. L. Hauke
Attorney.

April 23, 1946.  W. C. WEHNER ET AL  2,398,983
SNAP GAUGE
Filed June 9, 1943  3 Sheets-Sheet 2
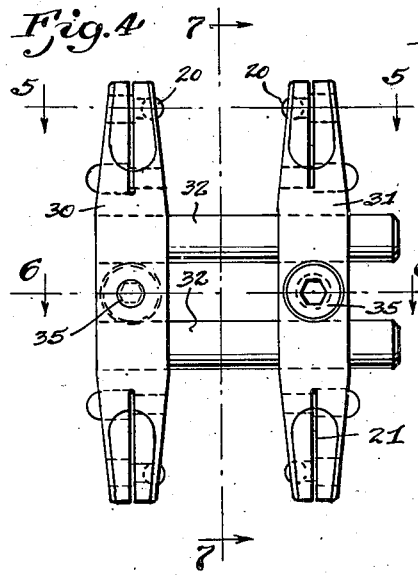
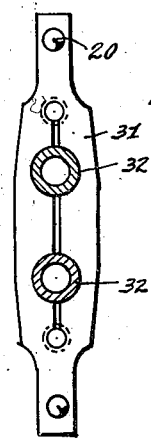
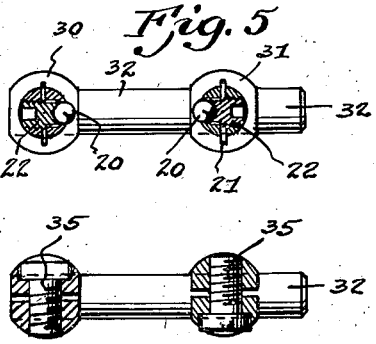
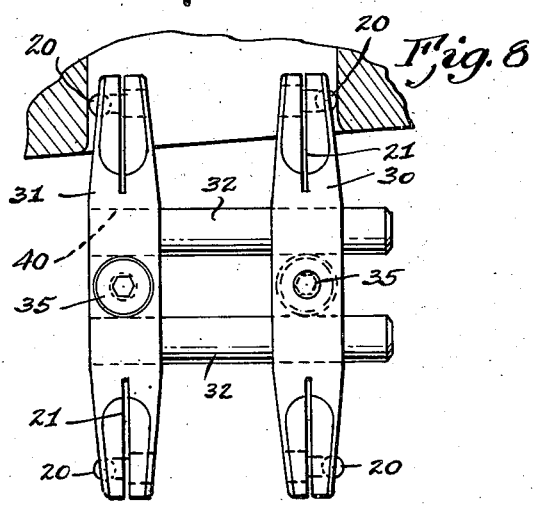
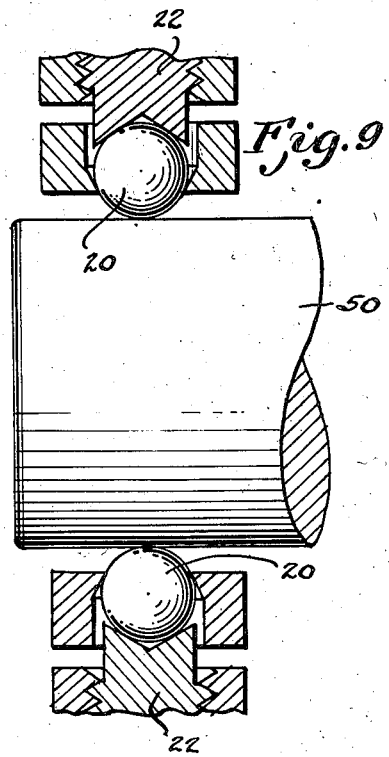
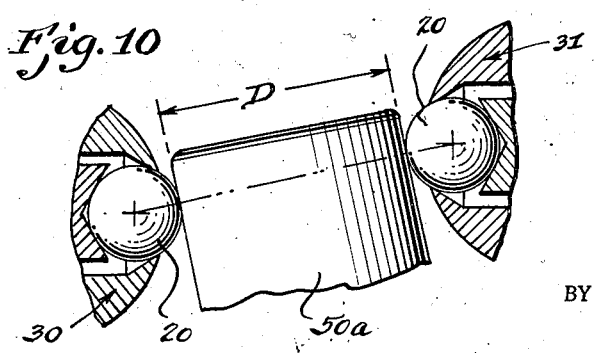
William C. Wehner
Wilson V. Giovara
INVENTORS
BY G. F. Hauke
Attorney.

April 23, 1946.　　W. C. WEHNER ET AL　　2,398,983
SNAP GAUGE
Filed June 9, 1943　　3 Sheets-Sheet 3
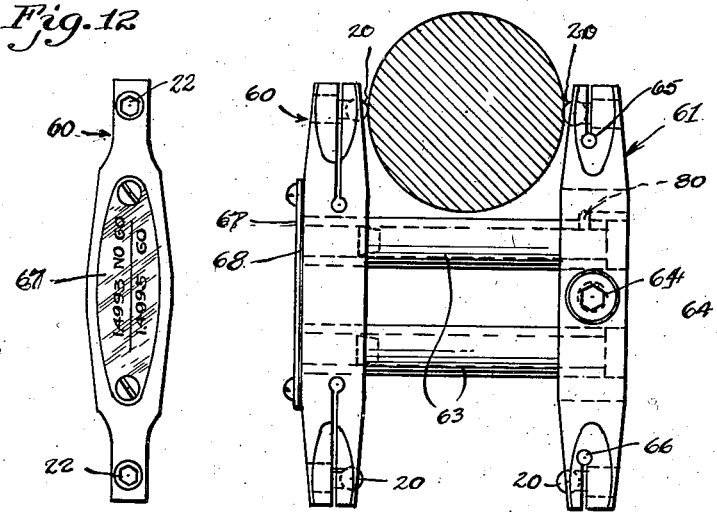
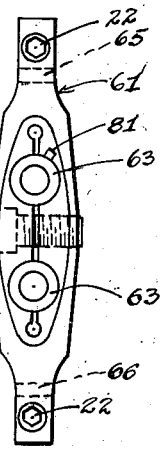
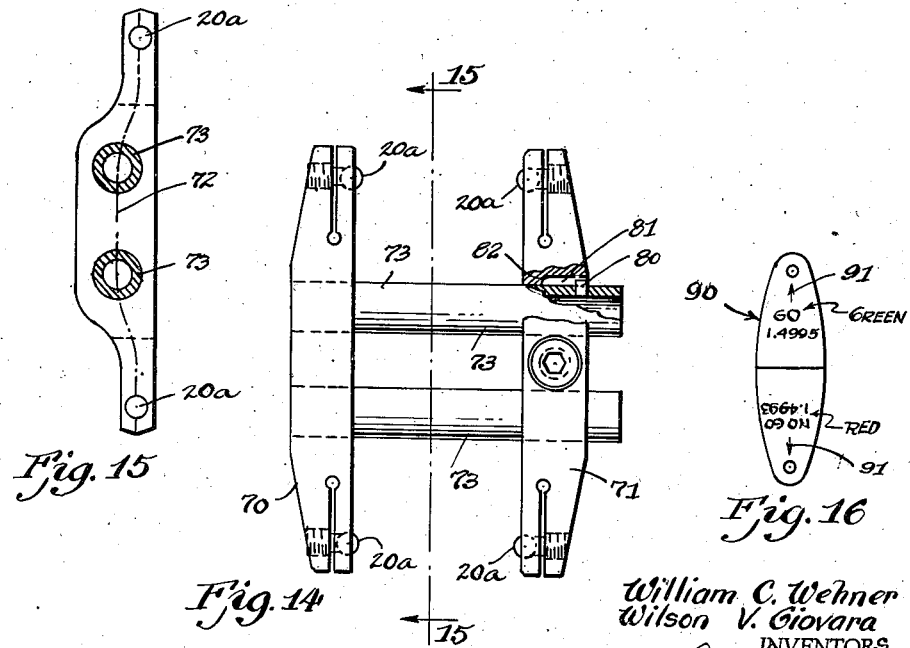
William C. Wehner
Wilson V. Giovara
INVENTORS
BY
Attorney Patented Apr. 23, 1946

2,398,983

UNITED STATES PATENT OFFICE 2,398,983

SNAP GAUGE

William C. Wehner and Wilson V. Giovara, Detroit, Mich.

Application June 9, 1943, Serial No. 490,210

4 Claims. (Cl. 33—168)

Our invention relates to machine tools and more particularly to a snap gauge operable to check inside and outside dimensions of machined parts or other work pieces. However, a snap gauge of this type is most generally employed for checking outside dimensions.

The present snap gauge embodies various improved features facilitating the production manufacture of same with a minimum of time and expense, and is also constructed to allow the use of the gauge for a relatively wide range of dimensions, and to provide for a "go" and "not go" gauge on the same instrument.

An object of our present invention is to provide an improved snap gauge offering a relatively greater measuring range, and thereby combining a plurality of gauges into a single instrument.

Another object of our invention is to construct an improved snap gauge by providing independently adjustable contact balls for engagement with the part being checked, which balls may be angularly adjusted as well, to prolong life, to insure accurate measurement, and to provide for easy servicing, since worn balls can be readily replaced with a minimum of time and expense.

A further object of our invention is to construct an improved snap gauge, whereby to obtain greater accuracy of inspection heretofore obtained with more or less difficulty with flat surfaced gauging pins, which are more susceptible to temperature variations in the shop, and which are quite easily thrown out of alignment resulting in inaccurate inspection. With the use of contact balls as employed with our snap gauge some misalignment of the gauge arms is permissible without effecting the operation of the gauge or the accurate inspection of the parts which are being inspected.

A further object of our invention is to construct an improved snap gauge which is not readily permitted to get out of adjustment by providing independently adjustable contact elements and means for yieldingly locking said contact elements in position.

A still further object of our invention is to construct a snap gauge comprising a single instrument provided with an improved means for marking same to indicate to the operator the "go" and "not go" gauge adjustment, by marking the gauge with green and red marking devices, which respectively indicate the said "go" and "not go" gauge adjustment.

For a more detailed understanding of our invention, reference may be had to the accompanying drawings illustrating preferred embodiments of our invention, in which like characters refer to like parts throughout the several views, and in which:

Fig. 1 is an elevational view, partly in section, of a snap gauge constructed in accordance with our invention, Fig. 2 is a sectional view thereof taken on substantially the line 2—2 of Fig. 1, Fig. 3 is an enlarged sectional view of the contact ball and the locking screw, Fig. 4 is an elevational view of a modified form of construction embodying arms which are substantially circular in cross-section, Fig. 5 is a detail sectional view taken on the line 5—5 of Fig. 4, Fig. 6 is a detail sectional view taken on the line 6—6 of Fig. 4, Fig. 7 is a detail sectional view taken on the line 7—7 of Fig. 4, Fig. 8 is an elevational view of a still further modified form showing how the gauge arms may be interchangeably assembled to form a gauge for inspecting or measuring inside dimensions, Fig. 9 is an enlarged detail view showing the gauge employed in measuring or inspecting an outside dimension, Fig. 10 is a fragmentary detail view illustrating an exaggerated misalignment of the gauge arms, but which shows how our improved contact balls are still serviceable to accurately inspect a part whose dimensions are being checked, Fig. 11 is an elevational view of a still further modified construction, Fig. 12 is an end view thereof showing how a transparent covering may be attached to one of the gauge arms to protect the gauge marking, Fig. 13 is an elevational view of the other end, Fig. 14 is an elevational view of a snap gauge comprising gauge arms constructed of a forging and constructed to permit the use of a gauge in measuring dimensions closely adjacent to a shoulder or other obstruction, Fig. 15 is a detail sectional view taken substantially on the line 15—15 of Fig. 14, and Fig. 16 is a detail elevational view of a marking card which may be secured to the gauge.

The present gauge comprises a pair of arms 10 and 11 supported substantially parallel as shown in the elevational view thereof. The arm 10 carried guide pins 12, which are preferably rigidly secured thereto to project normal to one side of the arm. A plug 13 wedged into the recess 14 of the pin spreads the walls of the pin into tight engagement with the arm 10. The arm 11 is slidably supported on these pins and is clamped in any selected position by means of a clamp screw 15. Preferably the arm 11 is split as at 16 to facilitate clamping of said arm on the guide pins.

Suitable contact elements, preferably balls 20 are secured adjacent to opposite ends of the arms 10 and 11, said arms being preferably split as at 21 to form arm portions 10a, 10b, and 11a and 11b. By particularly observing Figs. 1 and 3 it will be seen how these balls 20 are locked in place, an adjustable screw 22 seating against the ball and exerting a pressure against same thereby seating the ball against the inwardly extending flange 23 of one arm portion. Fig. 3 illustrates one end of the arm 11. The gauge is made ready for use by setting the distance between a pair of balls 20 to any predetermined dimension. Thus the balls 20 adjacent the top end of arms 10 and 11 may be set a maximum distance while the balls at the lower end may be set for a minimum dimension. Thus more particularly, in inspecting the machined part whose outside dimension, for instance, may be restricted to limits of plus or minus a few thousandths, the balls at the upper end are set for the maximum limits while the balls at the lower end are set for the minimum limits. Each of these balls are independently adjustable and yieldingly locked in the adjusted position. It will be observed that the operator may employ a standard gauge block and roughly adjust the sliding arm 11 to the gauge blocks, which are interposed between pairs of balls. Then each set screw 22 is tightly secured down against the ball and by so doing, it will be observed that the arm portions 10b and 11b are slightly sprung and thus exert an axial force against the screw, which locks the same against movement in the arm portions 10a and 11a. Thus a pair of balls are quite easily set for a "go" check while the other balls are set for a "not go" check.

We have devised an original and novel device for marking the snap gauge. The arms 10 or 11 or both of them, may be provided with a recess 25 into which is pressed a button made of plastic or other suitable material. One of these buttons is green while the other is red in color, the green button indicating that that end of the snap gauge is the "go" gauge while the other end marked with the red button is the "not go" marking.

Figs. 4 to 7 inclusive illustrate a modified form of our invention, and this structure is similar in principle to that illustrated in Figs. 1 to 3 inclusive with the difference, however, of the cross-sectional shape of the arms 30 and 31. These arms are substantially circular in cross-section, and are substantially symmetrical thereby facilitating production manufacture of the gauge. The arm 30 corresponds to arm 10 of Fig. 1, and the guide pins 32 which correspond to guide pins 12, are rigidly fixed to arm 30. The arm 31 is slidably adjusted on these guide pins and is clamped in a predetermined position by a clamping screw 35. The contact balls 20 carried by these arms 30 and 31 are independently adjustable in a manner the same as the contact balls shown in Figs. 1 and 3. The guide pins 32 are here shown as tubular sections, but it will be understood that applicants may employ either tubes or solid shafts for these guide pins whichever seem most desirable.

It will be observed that these arms 10, 11 and 30 and 31 are interchangeable with each other, and in Fig. 8 we have illustrated an assembly in which the arm 31 is rigidly secured as at 40 to the guide pins 32 and arm 30 is slidably adjusted on the guide pins 32 and clamped in position by means of the clamping screw 35. It will be observed that this interchangeable assembly is readily had since the said arms are substantially identically constructed. These arms can, if desired, be turned 180° around their longitudinal axis from the position shown in Fig. 4 before assembly in order to locate the contact balls 20 on the extreme outer surface of the arms thereby providing the snap gauge for checking inside diameter.

Fig. 9 illustrates the application of the snap gauge for checking an outside dimension of the part 50, and normally these balls are carried by arms which are substantially aligned. However, if the arms carrying these balls are slightly misaligned it will not affect the accurate operation of the snap gauge. In Fig. 10 we have illustrated an exaggerated mis-alignment of the arms 30 and 31 and it will be observed that the contact balls 20 may be adjusted for a predetermined clearance between the balls and will therefore accurately check an outside dimension or diameter of a machined work piece 50a.

Figs. 11 to 13 inclusive illustrate a modified construction, and comprise a pair of relatively adjustable arms 60 and 61 that are split as at 62 and provided with adjustable contact balls 20. The pins 63 are rigidly secured to the arm 60 and slidably support the arm 61, which is clamped thereon by a clamping screw 64. Arm 61 carries a green plug 65 adjacent one end and a red plug 66 adjacent the other end, said green and red plugs respectively marking the "go" and "not go" gauges. On the arm 60 a transparent plastic strip 67 is secured and overlies a printed label 68 on which is marked the maximum and minimum dimensional limits to which the gauge is set to check.

Figs. 14 and 15 illustrate another modified construction comprising gauge arms 70 and 71 made out of a forging. In Fig. 15, the dot and dash line 72 indicates the parting line of the forging. It will be noted that the contact balls 20a are offset to one side of the guide pins 73, and this construction makes possible the use of the gauge in tight places or when the surface to be checked is closely adjacent a shoulder or other obstruction.

The guide pins 63 of Fig. 11 and pins 73 of Fig. 14 carry a stop pin 80 which engages in a slot 81 in the gauge arm, and engages the end of the slot indicated by 82 to stop the arm slidably supported on said pins from coming off the pins. Obviously any suitable means can be employed for keeping the movable arm from falling off the pins.

In place of the green and red plugs used as "go" and "not go" indicators, we have also devised a simplified modification comprising a paper label 90, one half of which is colored green while the other half is colored red. The label is printed "go" on the green half and also this portion of the label is marked with the maximum dimension for which the gauge is set. The label is printed "not go" on the red half and also this red portion of the label is marked with the minimum dimension for which the gauge is set. This label is secured under the transparent sheet 67 and is positioned to place the green half adjacent the "go" gauge setting the arrows 91 showing the operator which end of the gauge is the "go" gauge setting.

It will thus be seen that we have provided a snap gauge which may be readily machined and manufactured in quantity production. The gauge offers a relatively greater measuring range than is had with snap gauges most generally employed in industry. The relatively adjustable arms provide for an approximate adjustment and the independently adjustable contact balls provide for a final accurate "go" and "not go" gauging device on the same instrument. It is plain that when these balls wear to any extent, the balls may be angularly adjusted to bring an unworn ball surface into operation, and when said balls are unduly worn the same may be replaced very quickly and readily with new balls and with a minimum of maintenance cost.

Although we have illustrated a preferred embodiment of our invention and have described in detail but a single application thereof, it will be apparent to those skilled in the art to which our invention pertains, that various modifications and changes may be made therein without departing from the spirit of our invention or from the scope of the appended claims.

We claim:

1. A snap gauge comprising relatively adjustable arms split to form bifurcated arm portions, contact balls carried by each of said arms, each ball supported in one arm portion, and an adjustable screw carried by said other arm portion and abutting said ball, said adjustable screw urged tightly against the said ball and tending to spread said arm portions, the inherent resiliency of said arm portions exerting spring tension on said adjusting screw to lock same in position.

2. A snap gauge comprising a pair of relatively adjustable substantially parallel arms, a pair of guide pins secured to one of said arms and projecting normal thereto, said other arm adjustably carried on said guide pins, means for clamping said last mentioned arm on said guide pins, said arms each being split to form bifurcated arm portions, a contact element supported in one arm portion and an adjusting screw carried by said other arm portion and engaging said contact element, said adjusting screw operable to relatively adjust said arm portions to thereby relatively adjust the contact element carried by one arm portion with respect to the contact element carried by an arm portion of the associated arm.

3. A snap gauge comprising a pair of relatively adjustable substantially parallel arms, a pair of guide pins secured to one of said arms and projecting normal thereto, said other arm adjustably carried on said guide pins, means for clamping said last mentioned arm on said guide pins, said arms each being split to form bifurcated arm portions, a contact element supported in one arm portion and an adjusting screw carried by said other arm portion and engaging said contact element, said adjusting screw operable to relatively adjust said arm portions to thereby relatively adjust the contact element carried by one arm portion with respect to the contact element carried by an arm portion of the associated arm, said arm portions which carry said contact elements being sprung by screwing said adjusting screw tightly against the contact element, the inherent resiliency of said sprung arm portion exerting a spring tension on said adjusting screw to lock same in position, the aforesaid arm portions which carry contact elements being of lesser thickness than the arm portions which carry said adjusting screws.

4. A snap gauge comprising relatively adjustable arms, each of said arms being machined substantially circular in cross section and longitudinally split at each end to provide a pair of arm portions, contact balls carried by one of said arm portions and an adjusting screw carried by the other arm portion and engaging the contact ball aforesaid, said adjusting screw operable to be screwed tightly against said contact ball and thereby relatively spread said arm portions, whereby to relatively adjust the position of a contact ball on one arm with respect to the contact ball of an associated arm.

WILLIAM C. WEHNER.
WILSON V. GIOVARA.